(12) United States Patent
Huebner et al.

(10) Patent No.: US 9,862,327 B2
(45) Date of Patent: Jan. 9, 2018

(54) MULTI-PURPOSE STORAGE COMPARTMENT

(71) Applicant: FORD GLOBAL TECHNOLOGIES, LLC, Dearborn, MI (US)

(72) Inventors: Annette Lynn Huebner, White Lake, MI (US); Ryan Welch, Ottawa Lake, MI (US); Kristin Ann Hellman, Walled Lake, MI (US); Artur Sakarian, Ann Arbor, MI (US); Matthew B. Rutman, Canton, MI (US); Joshua Greiner, Detroit, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/071,939

(22) Filed: Mar. 16, 2016

(65) Prior Publication Data
US 2017/0267184 A1 Sep. 21, 2017

(51) Int. Cl.
*B60R 7/06* (2006.01)
*B60R 11/02* (2006.01)
*B60R 11/00* (2006.01)

(52) U.S. Cl.
CPC ............ B60R 7/06 (2013.01); B60R 11/0252 (2013.01); *B60R 2011/0005* (2013.01); *B60R 2011/0082* (2013.01); *B60R 2011/0084* (2013.01)

(58) Field of Classification Search
CPC .................. B60R 7/06; B60R 11/0252; B60R 2011/0005; B60R 2011/0084
USPC ...................................................... 296/36.12
See application file for complete search history.

(56) References Cited

U.S. PATENT DOCUMENTS

| 5,915,776 A * | 6/1999 | Bieri ......................... B60R 7/10 296/37.12 |
| 6,206,442 B1 * | 3/2001 | Breunig ................. B60N 3/104 296/208 |
| 7,290,818 B2 * | 11/2007 | Haba .................... B60R 11/0235 180/315 |
| 7,407,212 B2 | 8/2008 | Kataoka et al. |
| 7,494,172 B2 | 2/2009 | Herterich et al. |

(Continued)

FOREIGN PATENT DOCUMENTS

| DE | 19906052 A1 | 8/2000 |
| DE | 19908130 A1 | 8/2000 |
| WO | 2008116990 A2 | 10/2008 |

OTHER PUBLICATIONS

English Machine Translation of DE19906052A1.
English Machine Translation of DE19908130A1.
English Machine Translation of WO2008116990A2.

*Primary Examiner* — Pinel E Romain
(74) *Attorney, Agent, or Firm* — Vichit Chea; King & Schickli PLLC

(57) ABSTRACT

A vehicle dash panel storage compartment includes a storage bin disposed within the dash panel and a top-mounted storage bin closure. The storage bin closure is configured to translate between a deployed position covering the storage bin and a stowed position. A deployable tray is disposed within the storage bin, configured for translation between a stowed position and a plurality of deployed positions substantially parallel to a plane defined by a vehicle x-axis. In the deployed position, the deployable tray divides the storage bin into two vertically stacked sections.

18 Claims, 5 Drawing Sheets

(56) References Cited

U.S. PATENT DOCUMENTS

| | | | | |
|---|---|---|---|---|
| 7,621,489 B2* | 11/2009 | Cvek | A47B 21/007 | 248/132 |
| 7,623,958 B1* | 11/2009 | Laverick et al. | B60R 11/0258 | 361/679.01 |
| 7,685,901 B2* | 3/2010 | Leopold | B60R 11/02 | 296/24.34 |
| 7,926,861 B2 | 4/2011 | Merlo et al. | | |
| 8,002,179 B2* | 8/2011 | Feit | B60K 35/00 | 235/382 |
| 8,328,265 B2* | 12/2012 | Danz | B60R 7/04 | 296/37.12 |
| 8,403,392 B2* | 3/2013 | Okimoto | B60R 7/06 | 292/121 |
| 9,045,089 B1* | 6/2015 | Bisson | B60R 7/06 | |
| 9,079,540 B2* | 7/2015 | Harding | B60R 11/02 | |
| 9,428,118 B1* | 8/2016 | Rawlinson | B60R 11/0252 | |
| 2008/0174136 A1* | 7/2008 | Welschholz | B60R 7/06 | 296/37.12 |
| 2011/0169292 A1 | 7/2011 | Gayon et al. | | |
| 2012/0139280 A1* | 6/2012 | Jung | B60K 35/00 | 296/37.12 |
| 2014/0054918 A1* | 2/2014 | Tujague | B60R 11/0258 | 296/37.12 |

\* cited by examiner

MULTI-PURPOSE STORAGE COMPARTMENT

TECHNICAL FIELD

This disclosure relates generally to motor vehicle storage compartments, and more particularly to a versatile dash panel storage compartment for a motor vehicle.

BACKGROUND

A wide variety of storage compartments are provided in the modern motor vehicle to allow storage of personal items. Dash-mounted storage compartments such as glove compartments are highly desired by the consumer, to allow easy and convenient access to such stored items. However, storage space in the modern motor vehicle is at a premium, and only a finite amount of space can be devoted to dash-mounted storage compartments in order to accommodate other necessary and desired components typically included in the modern motor vehicle dashboard.

Conventional vehicle glove compartments typically include a front-mounted hinged closure which swings outwardly into the passenger compartment to allow access to items stored in the compartment. However, particularly in smaller vehicles this glove compartment closure design undesirably impacts passenger legroom, and indeed it may be difficult or inconvenient to open such a conventional glove compartment closure when a passenger is occupying the vehicle seat positioned in front of the glove compartment. Still more, for certain vehicle styles it may not be necessary or desirable to provide a traditional glove box. Instead, the user may prefer a sleek, uninterrupted dash panel design necessitating an alternative design of storage.

To solve this and other problems, the present disclosure relates to a vehicle dash panel storage compartment configured to provide desired storage capacity. Advantageously, the described dash panel storage compartment includes a top-mounted closure panel that does not encroach on the passenger compartment when a vehicle occupant places items into or retrieves items from the compartment.

SUMMARY

In accordance with the purposes and benefits described herein, in one aspect a vehicle dash panel storage compartment is described, comprising a storage bin disposed within the dash panel and a top-mounted storage bin closure. In embodiments, the storage bin closure is a panel configured to translate between a deployed position covering the storage bin and a stowed position substantially parallel to one of a plane defined by a vehicle x-axis and a plane defined by a vehicle z-axis.

In embodiments, the dash panel storage compartment may further include a deployable tray disposed within the storage bin. The deployable tray may be configured for translation between a stowed position substantially parallel to a plane defined by a vehicle z axis and a plurality of deployed positions substantially parallel to a plane defined by a vehicle x axis. In embodiments, the plurality of deployed positions includes a configuration wherein at least a portion of the deployable tray is held below the deployed storage bin closure.

In other aspects, the present disclosure describes vehicle dash panels including the dash panel storage compartment as described above.

In the following description, there are shown and described embodiments of the disclosed dash panel storage compartment. As it should be realized, the device is capable of other, different embodiments and its several details are capable of modification in various, obvious aspects all without departing from the devices set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed dash panel storage compartment, and together with the description serve to explain certain principles thereof. In the drawing.

Reference will now be made in detail to embodiments of the disclosed dash panel storage compartment, examples of which are illustrated in the accompanying drawing figures.

DETAILED DESCRIPTION

Figure 1:
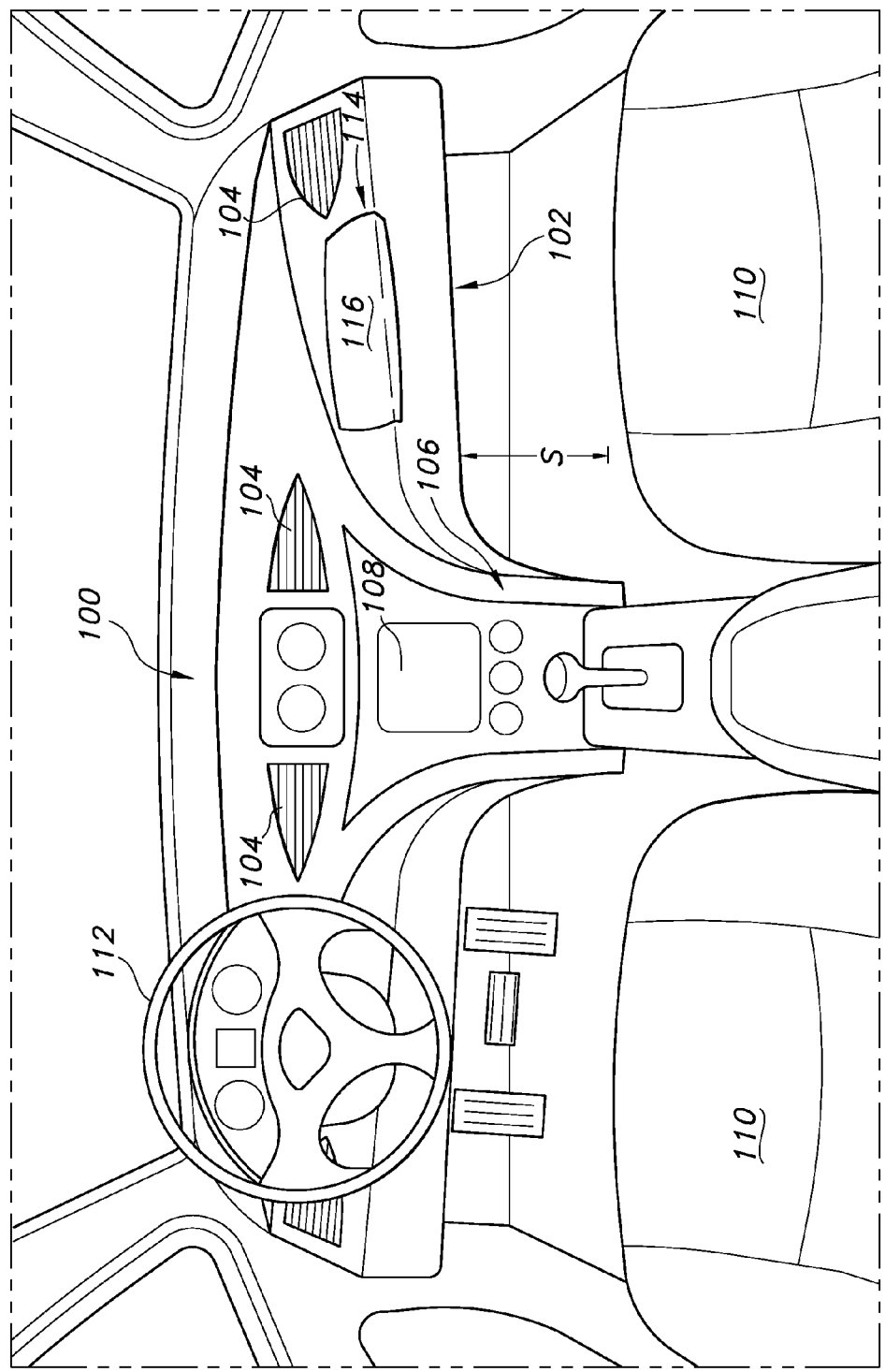
FIG. 1 depicts a vehicle including a dash panel and a dash panel storage compartment including a top-mounted closure panel according to the present disclosure, with the closure panel in a fully deployed position.

FIG. 1 depicts a vehicle 100 including a dash panel 102, registers 104, a center console 106 including an entertainment/information center 108, driver-side and passenger-side seats 110, steering wheel 112, and other features conventionally provided in the modern motor vehicle. Also included is a dash panel-mounted storage compartment 114 disposed on a passenger's side of the dash panel 102, substantially in front of the passenger's seat 110. The dash panel-mounted storage compartment 114 includes a top-mounted cover defined by a translatable closure panel 116. When in a closed position as shown in FIG. 1, the top-mounted closure panel 116 may define a substantially flush surface with the surface of the dash panel 102, thus providing an aesthetically pleasing appearance. Advantageously, the top-mounted closure panel 116 is configured for opening and closing without encroaching on any passenger-occupied portion of the vehicle 100 passenger cabin, unlike conventional vehicle glove boxes including front-mounted closure panels/doors. A substantially conventional latch (not shown)

may be provided for retaining the closure panel 116 in the closed position shown in FIG. 1.

The translatable closure panel 116 is configured for translation between the closed/deployed position covering the storage compartment 114 as shown in FIG. 1 and an open position allowing access to an interior 118 (see FIG. 3) of the storage compartment. This can be accomplished simply by hingedly mounting the closure panel 116 to a portion of the dash panel 102, to a portion of an underlying dash panel frame (not shown), or to an interior wall of the storage compartment 114. The closure panel 116 may then simply be pivoted upwardly to access the interior 118.

Figure 2:
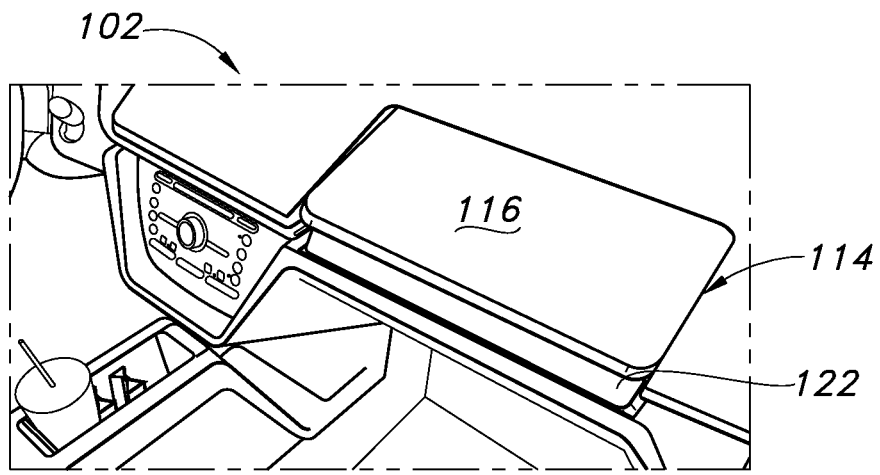
FIG. 2 shows the dash panel storage compartment of FIG. 1, with the closure panel translating from the fully deployed position to a stowed position.
Figure 3:
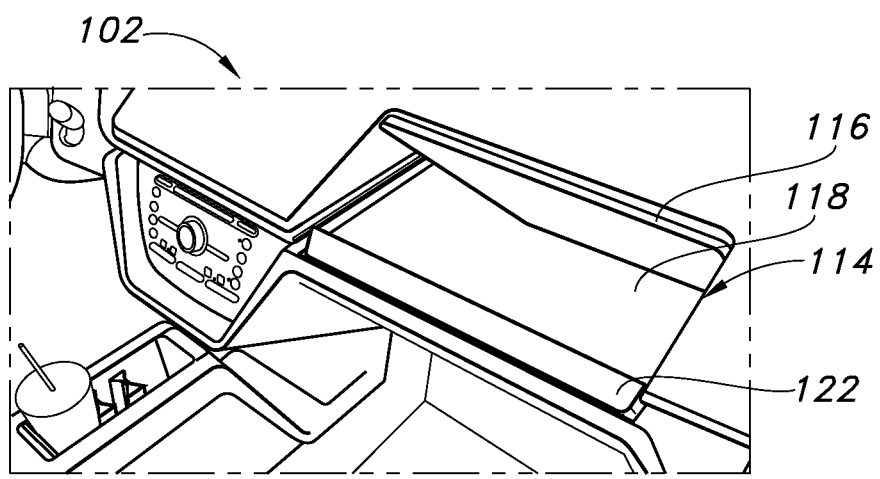
FIG. 3 shows the dash panel storage compartment of FIG. 1, with the closure panel in the stowed configuration.
Figure 4:
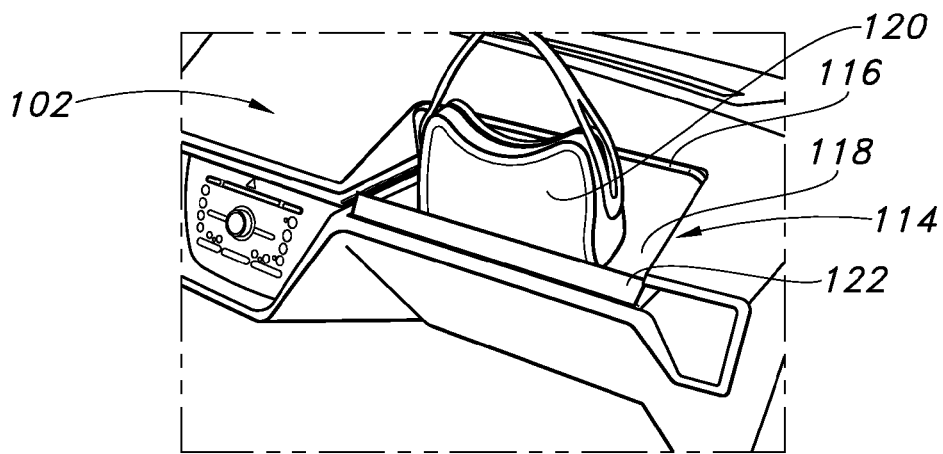
FIG. 4 shows an item placed in the dash panel storage compartment held in the stowed configuration of FIG. 3.

As shown in FIGS. 2 and 3, the top-mounted closure panel 116 may also be configured for sliding translation between a fully deployed/closed position covering the storage compartment interior 118 as shown in FIG. 1, and a stowed position allowing access to the compartment interior. This provides the advantage of hiding the closure panel 116 when not in use. A vehicle occupant may then place any desired item 120 in the storage compartment interior 118, for example the purse shown in FIG. 4.

In an embodiment, the closure panel 116 is slidingly translated to the stowed position, wherein the panel is held in an orientation substantially parallel to a plane defined by the vehicle x-axis. As will be appreciated, this could be accomplished by sliding the panel 116 in a vehicle x-axis direction or in a vehicle y-axis direction, according to the space allowable by the construction of the dash panel 102.

In another embodiment, the closure panel 116 is slidingly translated vehicle-downwardly to the stowed position. This is accomplished by pivoting the panel 116 upwardly as described above, and then sliding the panel to the stowed position shown in FIG. 3. As will be appreciated, this could be accomplished by pivoting the panel 116 in a vehicle x-axis direction or in a vehicle y-axis direction, according to the space allowable by the construction of the dash panel 102, and then sliding the panel downwardly (vehicle z-axis) to the stowed position.

In another aspect the storage compartment 114 also includes a tray 122 that is configured for translation between a stowed position and a plurality of deployed positions. In the embodiment depicted in the drawing figures, the tray 122 is held in a stowed position (see FIGS. 3-4) oriented substantially parallel to a storage compartment 114 wall. As shown in the depicted embodiment, for convenience and reasons of packaging space, in the stowed position the tray 122 is held adjacent an opposite storage compartment 114 wall from the closure panel 116.

Figure 5:
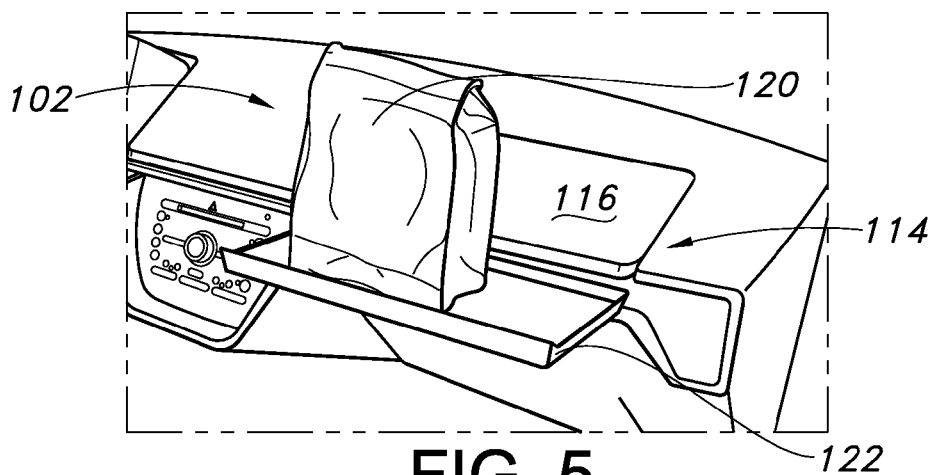
FIG. 5 shows the dash panel storage compartment of FIG. 1 with a deployable tray placed in a fully deployed position.
Figure 6:
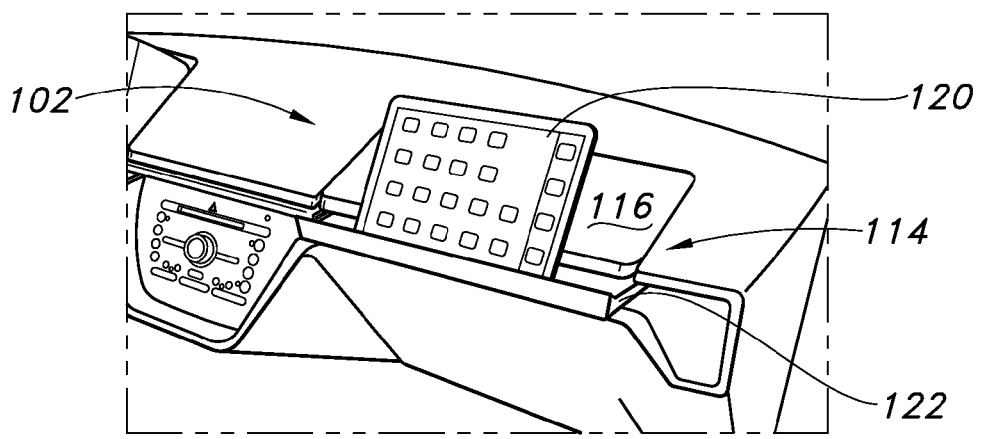
FIG. 6 shows the deployable tray of FIG. 5 in a partially deployed position.
Figure 7:
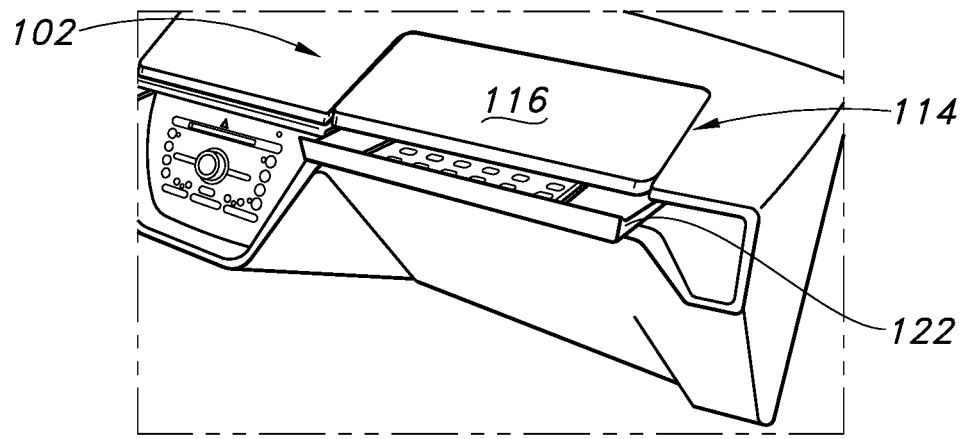
FIG. 7 shows the dash panel storage compartment of FIG. 1 with the closure panel in the deployed position and the deployable tray of FIG. 5 in a partially deployed position.

To deploy the tray 122, a user need only grasp a portion of the tray and slide it in an upward direction, and then pivot the tray downwardly to the deployed position (see FIG. 5). A desired item 120 can then be placed on a top surface of the tray 122. Advantageously, the tray 122 is configured for translation between the stowed position of FIGS. 3-4 and a plurality of deployed positions as shown in FIGS. 5-8. Notches or grooves (not shown) in a portion of the deployable tray 122 and cooperating tabs (not shown) define stops allowing the tray 122 to be held at a particular deployed positions as shown in FIGS. 5-8. A groove 124 (see FIG. 9) may be provided to receive an end of the deployable tray 122 to hold it in a final position.

Figure 8:
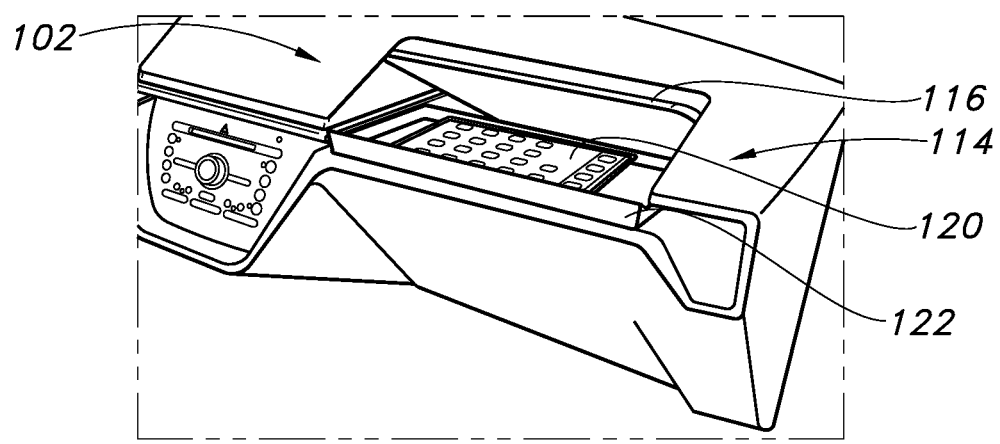
FIG. 8 shows the dash panel storage compartment of FIG. 1 with the closure panel in the stowed position and the deployable tray of FIG. 5 in a partially deployed position.

As shown in the drawing figures, advantageously the deployable tray 122 can be fully or partially deployed with the closure panel 116 in a deployed position (see FIGS. 5-7) or in a stowed position (FIG. 8). As will be appreciated, this effectively divides the storage compartment 114 into two vertically stacked portions whereby objects (not visible in this view) held in the storage compartment interior 118 (the first portion of the vertically stacked portions) can be hidden from view by sliding the tray 122 vehicle-forwardly. In turn, objects 120 can be placed on the tray 122 top surface (the second portion of the vertically stacked portions) for easy access.

Figure 9:
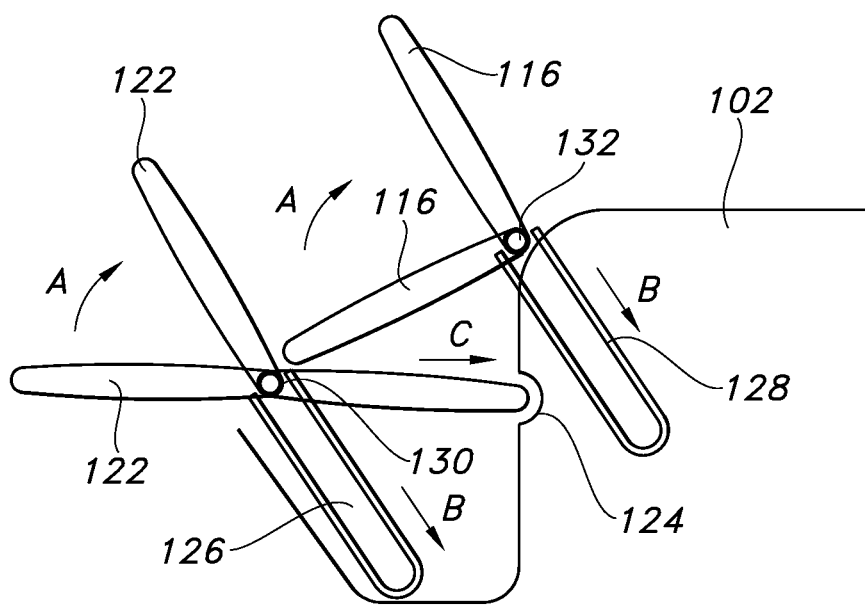
FIG. 9 shows the deployable tray of FIG. 5 and the closure panel of FIG. 1 translating to respective stowed positions in cooperating tracks.

In embodiments, with reference to FIG. 9 tracks 126, 128 are provided within an interior of the dash panel 102, in the depicted embodiment being substantially aligned with front and rear edges of the storage compartment 114. However, it will be appreciated that the tracks 126, 128 could be substantially aligned with side edges of the storage compartment 114, allowing the deployable tray 122 and/or closure panel 116 to be translated to a stowed position by pivoting upwardly and in a vehicle y-axis direction, and then downwardly.

The tracks 126, 128 are dimensioned to respectively receive the deployable tray 122 and closure panel 116 therein to allow translation of the deployable tray 122 and the closure panel 116 to the stowed positions described above. As shown in the drawing, each of the deployable tray 122 and the closure panel 116 are pivotally associated with a top portion of a respective track 126, 128, substantially at an open mouth thereof, by way of a pair of opposed bearings 130, 132. To translate the deployable tray 122 and the closure panel 116 to their stowed positions, the user need only pivot the desired structure upwardly (arrows A), and then slide the structure downwardly (arrows B) into tracks 126, 128. In turn, the deployable tray 122 may be translated in a vehicle x-axis orientation (arrow C) to be supported in groove 124 for use.

The benefits of the presently disclosed dash panel-mounted storage compartment 114 are apparent. The storage compartment is compact and versatile, allowing multiple configurations whereby useful, necessary, and/or desired items can be held in the storage compartment interior 118 and/or on the tray 122 surface. Because the storage compartment closure panel 116 is configured for opening and closing without encroaching on the passenger cabin area, a more streamlined, lower profile dash panel 102 is possible without sacrificing storage compartment usable storage area. This can be particularly useful for smaller vehicles.

Obvious modifications and variations are possible in light of the above teachings. For example, the closure panel 116 and/or the deployable tray 122 could be configured for translating between the described stowed and deployed positions by pivoting/sliding in a vehicle-forward, vehicle-rearward, and/or vehicle-lateral direction as dictated by the dash panel 102 size and any packaging requirements imposed by components including in the dash panel. All such modifications and variations are within the scope of the appended claims when interpreted in accordance with the breadth to which they are fairly, legally and equitably entitled.

What is claimed:

1. A dash panel storage compartment for a vehicle, comprising:
    a storage bin disposed within the dash panel; and
    a top-mounted storage bin closure adapted for pivoting about an axis and sliding between a deployed and a stowed configuration.

2. The dash panel storage compartment of claim 1, wherein the storage bin closure is a panel configured to translate between a deployed position covering the storage bin and a stowed position.

3. The dash panel storage compartment of claim 2, further including a deployable tray disposed within the storage bin.

4. The dash panel storage compartment of claim 3, wherein the deployable tray is configured for translation between a stowed position and a plurality of deployed positions substantially parallel to a plane defined by a vehicle x axis.

5. The dash panel storage compartment of claim 4, wherein the plurality of deployed positions includes a configuration wherein at least a portion of the deployable tray is held below the deployed storage bin closure.

6. A vehicle including the dash panel storage compartment of claim 1.

7. A dash panel for a vehicle, comprising:
   a housing; and
   a dash panel storage compartment comprising a storage bin disposed within the housing and a top-mounted storage bin closure adapted for pivoting about an axis and sliding between a deployed and a stowed configuration.

8. The dash panel of claim 7, wherein the storage bin closure is a panel configured to translate between a deployed position covering the storage bin and a stowed position.

9. The dash panel of claim 8, further including a deployable tray disposed within the storage bin.

10. The dash panel of claim 9, wherein the deployable tray is disposed for translation between a stowed position and a plurality of deployed positions substantially parallel to a plane defined by a vehicle x axis.

11. The dash panel of claim 10, wherein the plurality of deployed positions includes a configuration wherein at least a portion of the deployable tray is held below the deployed storage bin closure.

12. A vehicle including the dash panel of claim 7.

13. A dash panel for a vehicle, comprising:
    a housing; and
    a dash panel storage compartment comprising:
        a storage bin disposed within the housing;
        a deployable tray disposed within the storage bin; and
        a top-mounted storage bin closure adapted for pivoting about an axis and sliding between a deployed and a stowed configuration.

14. The dash panel of claim 13, wherein the storage bin closure is a panel configured to translate between a deployed position covering the storage bin and a stowed position.

15. The dash panel of claim 14, further including a deployable tray disposed within the storage bin.

16. The dash panel of claim 15, wherein the deployable tray is disposed for translation between a stowed position and a plurality of deployed positions substantially parallel to a plane defined by a vehicle x axis.

17. The dash panel of claim 16, wherein the plurality of deployed positions includes a configuration wherein at least a portion of the deployable tray is held below the deployed storage bin closure.

18. A vehicle including the dash panel of claim 13.

* * * * *